United States Patent [19]

Beveridge

[11] Patent Number: 5,559,858
[45] Date of Patent: Sep. 24, 1996

[54] METHOD AND APPARATUS FOR DELIVERING SECURED TELEPHONY SERVICE IN A HYBRID COAXIAL CABLE NETWORK

[75] Inventor: Gregory J. Beveridge, Thornton, Colo.

[73] Assignee: U S West Advanced Technologies, Inc., Boulder, Colo.

[21] Appl. No.: 467,343

[22] Filed: Jun. 6, 1995

Related U.S. Application Data

[63] Continuation of Ser. No. 357,558, Dec. 16, 1994, Pat. No. 5,469,495, which is a continuation of Ser. No. 69,227, May 28, 1993, abandoned.

[51] Int. Cl.⁶ ................................................. H04M 11/00
[52] U.S. Cl. ........................................... 379/56; 379/157
[58] Field of Search ........................... 379/56, 269, 201, 379/207, 157; 370/58.1, 73, 62, 58.2, 67, 71; 348/6, 7, 10, 12; 359/118, 125, 137; 455/3.1, 4.2, 5.1

[56] References Cited

U.S. PATENT DOCUMENTS

| | | | |
|---|---|---|---|
| 4,441,180 | 4/1984 | Schüssler | 348/12 X |
| 4,686,667 | 8/1987 | Ohnsorge | 359/118 X |
| 5,185,738 | 2/1993 | Kelly | 379/269 X |
| 5,189,673 | 2/1993 | Burton et al. | 370/58.2 |
| 5,301,057 | 4/1994 | Eames | 370/67 X |
| 5,303,229 | 4/1994 | Withers et al. | 370/58.1 |
| 5,325,223 | 6/1994 | Bears | 359/137 |

*Primary Examiner*—Curtis Kuntz
*Assistant Examiner*—Michael B. Chernoff
*Attorney, Agent, or Firm*—Timothy R. Schulte

[57] ABSTRACT

A hybrid coaxial cable network employing interdiction to ensure privacy in telephony communications. The video and telephony signals are secured such that telephony and interactive video signals to and from a subscriber do not appear on the network at any other undesired subscriber location.

6 Claims, 10 Drawing Sheets

METHOD AND APPARATUS FOR DELIVERING SECURED TELEPHONY SERVICE IN A HYDRID COAXIAL CABLE NETWORK

This application is a continuation of U.S. Ser. No. 08/357,558, filed Dec. 16, 1994, now U.S. Pat. No. 5,469,495, which is a continuation of U.S. Ser. No. 08/069,227, filed May 28, 1993, now abandoned.

FIELD OF THE INVENTION

The invention relates to the field of telecommunications. More particularly the invention relates to the field of multiplex communications. In still greater particularity, the invention relates to the provision of secured telephony in a coaxial cable network. By way of further characterization, but not by way of limitation thereto, the invention uses interdiction to prevent monitoring of a subscriber's telephone communications by another subscriber on the network.

DESCRIPTION OF THE PRIOR ART

Information, and access to it, has received significant attention recently. The building of an "information highway" compared to the national interstate highway system begun in the 1950s has been made a national priority. There are currently three wireline transport elements available for such a highway: (1) fiber optic cable; (2) coaxial cable; and (3) twisted copper pair cable ("twisted pair"). Presently, twisted pair cable predominates, certainly in the local loop portion of telephone networks. Coaxial cable has been used widely by cable television companies. Both telephone companies and cable companies have made use of fiber optics for main or trunk line signal transport.

Fiber optic cable can carry more information over a greater distance than coaxial cable, while coaxial cable can carry more information over a greater distance than twisted pairs. Because twisted pair is the predominant local loop technology, at least in the telephone industry, attempts have been made to develop technologies which will increase the carrying capacity of copper. In reality, copper wire is a very efficient transport means for traditional telephony services.

Within the telephony industry, the term "broadband" denotes a very high digital line rate, such as the 156 Megabits per second (Mb/s) optical line rate of new SONET OC3-level fiber optic systems. The term "baseband" describes the original (unmodulated) form of the electrical or optical signal associated with a single service that is typically presented to the network by a subscriber, and the final form of that signal presented from the network to a subscriber. The baseband signal can be either analog or digital in form, and is further characterized as the direct electromagnetic representation of the base information to be transmitted, with no other carrier or subcarrier energy present. A baseband signal may be carried directly on a transmission line, such as a twisted pair of insulated copper wires or an optical fiber. A baseband signal may also be used to modulate a carrier signal for transmission on a variety of transmission systems (e.g., radio). In telecommunications, the term "passband" describes the range of frequency spectrum which can be passed at low transmission loss through a linear transmission system. Modulated carrier signals presented to such a system will be delivered in their original form with minimal loss and distortion, as long as such signals fall within the absolute limits of the passband range of frequencies and the dynamic range of signal amplitude for a given linear transmission system.

An example should help clarify the relationship between baseband and passband. The electrical signal that is present at a telephone jack during a conversation is the baseband electrical signal representation of the talker's voice. This baseband signal is typically transported to the telephony switching office by a twisted pair of insulated copper wires. At the central office, the signal goes through the switch and is typically convened to digital form and multiplexed in the time domain for transmission through baseband digital transmission systems that carry such signals on copper or fiber optic cables to other locations. The baseband digital transmission system may carry thousands of individual telephone calls on the same transmission line. Even though there are multiple calls in progress on the same transmission line, such a system is still defined as "baseband" because there is no modulation of a carrier or subcarrier signal anywhere in the system, and, at any given instant of time, there is only a single subscriber's signal actually present at a given point on the line. As the original talker's signal reaches the other switching office involved on the call, it is converted back to the original analog form and put on the copper pair connected to the far-end telephone set, once again in baseband form.

Passband techniques can also be used to provide telephony services. In cable television systems configured for telephony services, the baseband analog telephone signal is used to modulate a carrier signal. The modulated carrier signal can be assigned a particular frequency within the passband of the linear transmission system. A number of such modulated carrier signals, each assigned a different carrier frequency in the passband, can be transmitted all at the same time without mutual interference. At the far end, a selected modulated carrier signal must be demodulated to remove the carrier signal and recover the baseband signal associated with the service. If the linear transmission system is operating properly, the derived signal will be delivered to the far-end telephone set, once again in baseband form.

While there is technology that supports digital line rates on the order of 100 Mb/s for short-distance building twisted-pair wiring, the practical limit for traditional twisted pair copper plant in the loop environment (from the serving central office to the subscriber) is on the order of 1.5 Mb/s, at a maximum distance of about 12 kilofeet (KF). One emerging technology that is capable of attaining this practical limit for twisted pairs is known as High-speed Digital Subscriber Line (HDSL). A similar copper-based technology known as Asymmetric Digital Subscriber Line (ADSL) may permit the carriage of a 1.5 Mb/s downstream signal toward the subscriber and an upstream channel of perhaps 16 kilobits per second (Kb/s), all on a single copper pair, to within 18 KF from the serving central office. Rather than modify its network to include more fiber and/or coaxial cable, at least one telephone company is deploying ADSL technology (*USA Today* 4/29/93, Page B1).

While suited for their intended purpose, these emerging copper-based technologies carry some uncertainties and special restrictions that may reduce their applicability in copper loop plant. At this point, the best-case scenario indicates that such technology could be used only on non-loaded copper loops within 12 KF (HDSL) and 18KF (ADSL), respectively. Thus, this technology would be employable in substantially less than 100 percent of the present environment. Other limitations (e.g., within-sheath incompatibility with other services such as ISDN) will likely further reduce the maximum penetration percentage.

The maximum practical distance that true Broadband rates (e.g., 156 Mb/s and higher) can be supported on twisted pair copper plant is on the order of 100 feet. Given that the emerging HDSL and ADSL copper-based technologies provide line rates two orders of magnitude below true broadband rates, and then cover substantially less than 100 percent of the customer base in the best case, copper is clearly not practical as a true broadband technology solution.

Baseband signal compression techniques offer possibilities for leveraging the embedded copper plant for certain specific services. Baseband compression techniques that compress a standard movie entertainment television signal with "VCRquality" into a 1.5 Mb/s channel (including audio) have been demonstrated, as well as lower-speed devices intended for videoconferencing and videotelephony applications. The apparent view is that a bearer-channel technology such as ADSL (described above) and a baseband compression technology, taken together, could offer a realistic alternative for video services requiring large bandwidth, allowing continued use of the existing copper plant and obviating the need for fiber-based or other broadband links.

Unfortunately, baseband compression techniques use a deliberate tradeoff of one or more technical parameters that can reasonably be "sacrificed" as having little or no effect on a given service. For example, low-bit-rate coders for voice and video obtain bandwidth efficiencies at the expense of transmission delay. A processing delay of perhaps a half-second through the encoding and decoding process will have little or no effect on one-way broadcast service, but may disturb the natural rhythm of speech in a two-way videotelephony application, making the two-way service awkward to use. Baseband compression techniques are narrowly designed for specific applications (e.g., videotelephony) within generic classes of service (e.g., video), and do not provide complete transparency of any baseband digital signal.

Line coding compression techniques that may be used to provide ADSL capabilities offer bandwidth efficiencies in a variety of ways. In one category, Quadrature Amplitude Modulation (QAM) techniques have been used to encode digital information for transmission on microwave radio systems and (more recently) channel slots on cable television systems. A 16-state QAM coder offers a 4 bits-perHertz (4 B/Hz) efficiency; a 64-state QAM coder offers a 6 bits-per-Hertz (6 B/Hz) efficiency. This simply means that an input digital signal at the rate of 1.5 Mb/s can be 16-state QAM-coded into an analog frequency spectrum of about 0.38 MegaHertz (MHz), making it possible to be transported on copper wire pairs over longer distances. Similar techniques are also possible on satellite and CATV systems, to provide both digital signal carriage and digital spectrum efficiencies on those media.

In summary, utilizing baseband signal compression techniques results in bandwidth efficiencies which are gained at the penalty of one or more technical parameters. Such a tradeoff may not be possible in the case of a different service on the same medium. In the case of wireline coding techniques that deal with the signal after baseband compression, technical complexity and cost generally limit it to 6 B/Hz spectrum efficiency. Thus, copper-based systems such as HDSL and ADSL may find limited application in the telephone network. HDSL is actually a pure cost-saving loop alternative to facility arrangements that serve 1.5 Mb/s High-Capacity digital service ("HICAP") customers. The cost savings are potentially realized by the ability to use assigned nonloaded pairs in the loop outside plant, rather than designed pairs, as well as going longer distances without outside plant repeaters.

ADSL technology could provide early market entry for limited VCR-quality video or other asymmetric 1.5 Mb/s applications. Advantages of ADSL include the use of existing copper plant facilities and maximization of network functionality. Disadvantages include the cost of set-top converters which are not reusable after ADSL is obsoleted. Also, ADSL offers only single channel service. In addition, the service can only reach a limited number of customers and telephone service electrical noise can result in video distortion. ADSL is also subject to RF transmission interference over longer loops.

Fiber optic-based systems are preferable to copper-based networks even with HDSL or ADSL because of their high bit rate transport capability. Information services that require true broadband rates require fiber or coaxial cable technology, as a practical matter. Even low-end (i.e., POTS "plain old telephone service") services will reflect a lower per-subscriber cost on fiber, compared to present copper-based delivery systems. Specifically, fiber-based systems that provide residence telephony to groups of 4–8 subscribers with fiber to the curb (FTTC) are expected to achieve cost parity with copper in the near future. However, the cost to replace the existing copper plant in the U.S. with fiber optics is estimated at hundreds of billions of dollars. Thus the length of time required to achieve this conversion could be decades.

One possible alternative to fiber or copper networks is a hybrid network which utilizes existing facilities and employs fiber optics, coaxial cable and copper wiring. Such a network would allow the delivery of many advanced services and yet be more cost efficient to allow earlier conversion to a broadband network with significant fiber optic capability included. At least one company has announced plans for such a hybrid network (*Denver Post*, Apr. 24, 1993 Page C1).

In general, hybrid networks combine a telephony network and a video network. One drawback of such a network is some duplication of equipment required to transport the separate signals. That is, if, for example, the telephony services could be sent over the video network, then a substantial portion of the cost and complexity of the hybrid network could be eliminated. However, in order to send telephony and video signals over the same transport medium, the unique characteristics of each signal must be addressed. For video signals this is not as difficult as some of the issues surrounding transport of telephony signals. That is, video signals are generally sent in one direction, from the provider to the subscriber, while telephony requires two-way transport. As video evolves into interactive video, however, two-way video signal transport issues will also become significant.

Telephony, in addition to requiring two-way communication, has two other requirements not necessarily addressed by video networks: powering and privacy of communication. In video networks the power to operate the subscriber television set, for example, is provided by the subscriber. That is, the subscriber plugs his or her television and/or video cassette recorder into an electrical outlet which provides power in the subscriber location. In the event of a power outage, for whatever reason, the user is unable to view the television unless he or she has a backup source of power (i.e., battery or generator). Few people have such backup power. In telephony, on the other hand, subscribers expect phone service whether or not electricity is available. The following paragraphs discuss a history of power in the telephony network.

Telephones on the early manual networks had their own battery boxes which contained dry cells. These batteries were used to power the carbon granule microphones. In addition, a hand crank generator in the phone supplied the needed signaling to call others on the same line, or the operator. These two power sources within the telephone allowed a user to originate a call and to talk to other users. Neither of these sources were dependent upon household power, allowing calls to be placed even before rural electrification.

When automatic switching was introduced into the network, the battery box was replaced with a common battery located at the switch, including a common ringing voltage source. The central office switch also needed power to operate and make connections between users. Supplying power to each telephone allowed current flow and the timed interruption of that current (dial pulses) to signal the switch of the user's intentions. In addition, the busy state current could be used by the telephone to power the carbon microphone.

Because of the need to protect the switch and the telephone connections from service interruptions, the power plant at the central office was backed up with large wet cell batteries. These batteries in turn were often backed up with motor-generator sets. Several different voltages are used within the network, but the primary supply is −48 volt direct current (vdc) and ±105 volts at 20 Hz.

Over time as the telephone network grew in size and service penetration approached 100 percent, service availability (reliability) became one of the most important obligations of the network. For a time the telephones in users' homes belonged to the network and were maintained by the network owner. In the past 20 years the ownership of the telephone has changed again and carbon microphones aren't used anymore. However, the new electronic telephones with their silicon chips still rely on the network to supply power for call supervision and even for memory backup.

Service availability is a responsibility shared by the network and the user. The network is responsible for maintaining the switch and connecting trunks as well as testing and maintaining the individual lines to each user. The user also contributes to service availability by keeping the telephone on-hook when it is not needed, by maintaining premises wiring and terminal equipment in good repair, and by limiting the total quantity of equipment connected to one line.

Maintaining the batteries in the telephone's battery box was difficult. Thus network power is preferable. First of all, the financial cost associated with placing the terminal power back in the terminal equipment would be huge. The supply and maintenance of the needed batteries would either be forgotten (like those in smoke detectors) or would be eliminated. Both of these results would limit the user's service availability. The second reason that power will likely remain in the network is due to the regulatory bodies who are concerned with "life-line" services. This relates to phone service being perceived as a necessity as pointed out above. Basic telephone service is expected to be available to everyone at a reasonable cost 24 hours a day.

There are a few exceptions. Some services are powered by the user today. As more services are introduced in the future, the user equipment associated with these new services may also be non-network powered. One good example is Integrated Services Digital Network (ISDN) services, whether Basic or Primary Rate Interfaces. With ISDN, the network powers its portion of the circuit and the user powers the terminal equipment. Most data services also fall into this category.

Power can only be provided over a fiber optic network with great difficulty and expense. As discussed above, power can and is easily provided over a copper-based network. There are video systems today which utilize cable phone systems in which telephony is provided over a video network system. However, such systems require power supplied by the subscriber, usually in the form of AC power and (in some cases) batteries at the subscriber premises. In addition, adaptive hardware in the form of converter boxes are needed to utilize the phone system.

Safeguarding privacy of communications is a fundamental rule in the telephone industry. This is required by law and violators are subject to heavy penalties. Telephone subscribers have the expectation that their usage and their communications will be kept confidential. The requirement for privacy extends to the identity of the parties to the communications, and even to the fact that the communications took place. Traditional loop plant architecture provides each subscriber a dedicated transmission path all the way back to the switching central office. Except for the deliberate case of multiparty service, the physical "star" topology ensures that every subscriber's communication is not available to others who are not a party to the communications. Referring to FIG. 1, a star type network architecture is shown. A star architecture is a physical point-to-multipoint arrangement. There are two types of star architectures. In FIG. 1A a private line type of star is shown. That is each of lines 1, 2, 3 . . . (n) is separate and distinct and provides a dedicated transmission path to the central office. In FIG. 1B a party line type of star is shown. In this case each of the parties commonly connected in this manner may listen to any of the others. There is no privacy. Such party line configurations, once common for cost reasons, are gradually being eliminated as networks are modernized.

Cable television systems are configured in a broadcast bus architecture, and all services carried on such systems are inherently available to all subscribers connected to the bus, including telephone channels carried in the passband. A logical bus type of architecture is illustrated in FIG. 2A. In a bus architecture all users share common bandwidth as in a party line star architecture. Generally, cable companies employ a "tree-and-branch" style bus architecture (FIG. 2B). This is essentially a logical bus on a tree and branch physical structure. Similarly, a party line architecture (FIG. 1B) is essentially a logical bus on a physical star. In any event, the bus style architecture used by cable companies, while sufficient for delivery of video services, does not ensure privacy of communications for telephony or interactive video services. While encryption techniques can be used to mitigate the potential problem, they add cost and are not foolproof. As interactive services that use voice-response units flourish, more mass-market customers will routinely be touch-toning such information as credit card numbers and PIN authorizations. Any bus-based architecture that provides telephony or interactive video services capability must incorporate means to ensure privacy of communications.

Finally, it is necessary to provide some means to segregate services (commonly termed "grooming" in the telephone industry) provided by the central office into two basic categories: "switched services" (e.g. POTS) that terminate on the line side of the central office switching machine; and "special services" (e.g. burglar alarm, program channel services, etc.) that terminate on other equipment in the central office. The segregation into these two categories is accomplished in modern telephone networks by the use of equipment that provides for Time Slot Interchange (TSI) of digital signals.

Modem digital switches recognize only signals which are transmitted in discrete digital rate and format. That is, the switch views the transmitted/received signal in 64 Kb/s increments. In order to make the signal intelligible to the switch, it must be presented in this basic format. For POTS, the switch expects to "see" a digital signal with a specific line code, line rate, ones density, frame format, and signaling bit convention, with other bits used for mu-law voice coding of the talker's voice. Special services signals are not usually in a form recognizable by the switch. Conventional networks use pulse code modulation techniques to convert from analog to digital and vice versa and then use time division multiplexing in order to sequence (package) a number of services in a common bit stream for transmission. Time division multiplexing divides the time during which each message is transmitted along the data link into discrete time intervals. Each port on the multiplexer is then sequentially sampled for the time interval and that data sample is transmitted sequentially or serially with a number of other data samples from other ports. A demultiplexer at the receiving end of the transmission then recombines the serially transmitted data into the port corresponding to the signal origin. While suited for its intended purpose, this type of transmission technique requires expensive time slot interchangers to reorder the time slots to separate switched services from special services. In addition, the TSI technique is not transparent to all of the bits. That is, the ability to perform certain functions such as cyclic redundancy check code (CRC6) on an end-to-end basis is lost with the TSI technique.

SUMMARY OF THE INVENTION

The invention is a network for providing video and telephony services to a subscriber. The network incorporates fiber optic cable, coaxial cable, and twisted pair copper wiring. The network provides power for the telephony services from a network location through coaxial and copper wiring to the subscriber. Power can be provided over coaxial cable relatively easily. Thus, in the hybrid network power for the telephony portion of the service is provided through the network from the point at which coaxial cable and copper are used. Interdiction devices are used to selectively transmit video signals to a subscriber location.

The invention relies on the use of fiber/coax passband infrastructure as the basic bearer channel for all services in the residential mass market served by the network. The selective delivering device would be physically located in place of a curbside Optical Network Unit (ONU), and subsumes all of the basic telephony functions ("talk" battery, ringing, testing, etc.). The selective delivery device operates as the source/sink element for baseband telephony, is powered over the coaxial cable plant from the optical node typically serving up to 400 subscribers, and provides complete transparency for the entire two-way passband spectrum into 4–8 homes, except for the channel slots used to transport telephony services. In one embodiment the actual link to the home consists of a twin-coaxial-cable "drop" that derives the tip/ring RJ-11 interface from the center conductors of the coaxial cable pair at a Network Interface (NI), compatible with all existing inside telephony wire arrangements. The other output of the NI is a standard F-fitting CATV connector, compatible with the existing coaxial cable inside wire. The curbside device also houses the passband interdiction device. In the preferred embodiment, the NI at the residence includes only passive filters and no active electronics.

The invention addresses the issue of communications privacy by permanently interdicting all of the telephony channels in the passband for both directions of transmission. The interdiction is accomplished external to the premises of all subscribers so served. No modulated telephony signal ever appears in recoverable form on the coaxial cable drop, ensuring complete privacy of communications. This interdiction can be accomplished by several means. One method involves the permanent insertion of a truly random jamming signal in the part of the passband that contains the telephony passband channels in the direction of transmission toward the customer. An alternative method involves the use of a negative trap (e.g. band-stop filters) that prevents any of the telephony passband channels from reaching the drop cable toward the subscriber. In the set of passband frequencies for the upstream direction of transmission (toward the central office), an isolation amplifier and suitable directional coupler arrangement prevents any individual subscriber from monitoring the upstream telephony channels of other telephony subscribers on the bus. Conventional jamming or negative trap techniques in the upstream direction of transmission are not appropriate, since there are other applications that originate from the subscriber premises that use a portion of the upstream frequencies. This requires transmission transparency from the subscriber toward the network. A preferred embodiment of the invention uses a modified interdiction device external to subscribers' premises to accomplish this function.

Nonswitched telephony special services (burglar alarms, etc.) must be sorted from ordinary switched telephony services. In the preferred embodiment, the present invention performs this function by frequency assignment at the remote telephony channel modulators and demodulators. This is accomplished by remotely setting both transmit and receive frequencies of the individual channels from the central office. At the central office, the blocks of switched services of modulated telephony channels in the passband are converted to/from the framed digital format required by the telephone switch, and the blocks of nonswitched special services are convened to the framed digital format and bypass the switch, or are further transported to other locations. Thus, use of the Time Slot Interchange (TSI) technique with its assorted limitations and high cost equipment is eliminated.

DESCRIPTION OF THE PREFERRED EMBODIMENT

Figure 3:
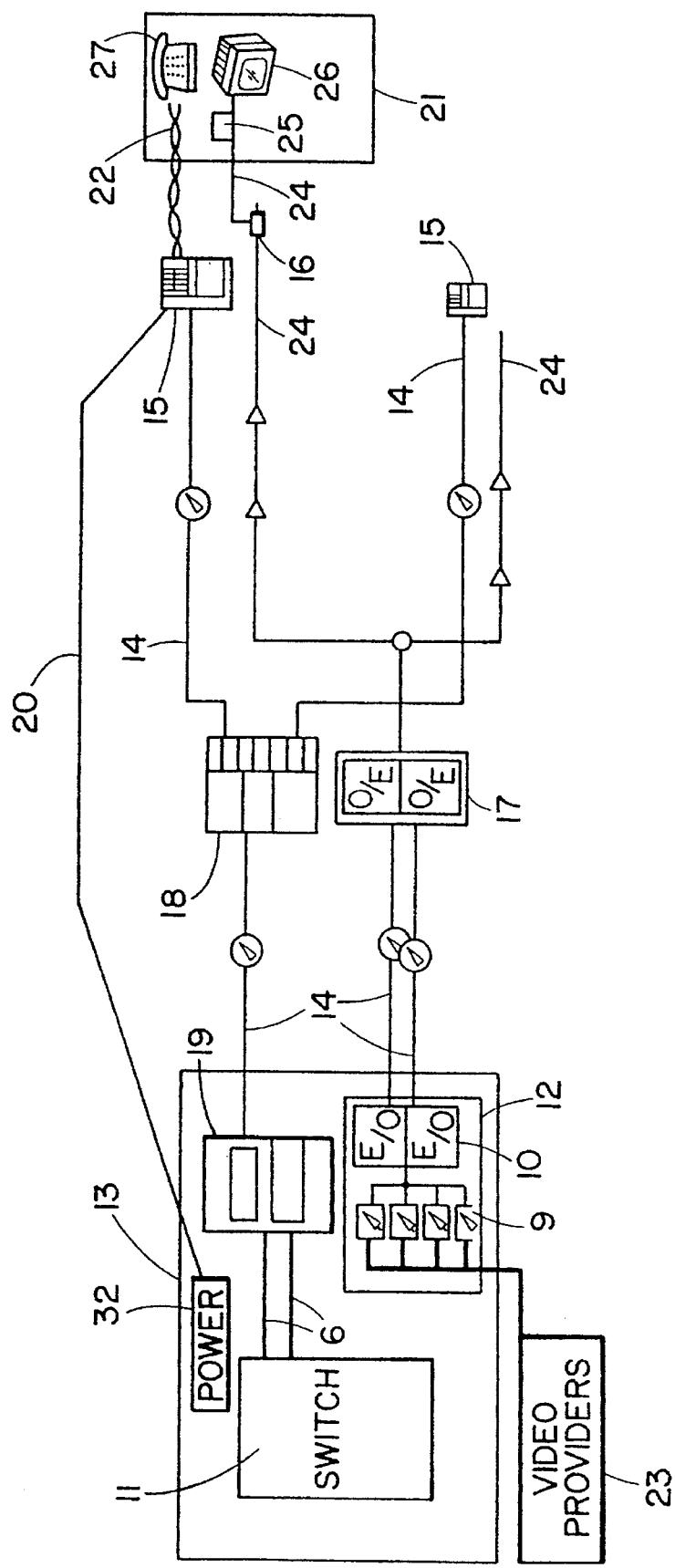
FIG. 3 illustrates a broadband hybrid fiber/coaxial cable network architecture.

Like reference numerals will denote like structure throughout the description of the various figures. Referring to FIG. 3, a broadband hybrid fiber/coaxial cable network architecture is shown. A digital switch 11 and a video transmission device 12 including RF modulators 9 and electric/optical converters 10 are shown in a central office 13. Digital telephony signals are carried over DS1 lines 6 through SONET multiplexer 19 to a fiber optic cable 14. This architecture represents a fiber to the curb (FTTC) type of architecture with a video remote transport overlay. That is, fiber optic cables 14 carry digital telephony signals (SONET OC3) from the central office through a remote digital terminal 18 to an optical network unit 15 (ONU). ONU 15 may include a video interdiction device 16 or interdiction device 16 could be separately located as shown in FIG. 3. The analog video signals (AM-FDM) from a number of video information providers 23 are carried through fiber optic cable 14 to one or more remote nodes which may include an analog passband video receiver 17 which includes optical/electrical converters where the analog optic signals are converted to analog electrical signals on a coaxial cable 24.

A power supply cable 20 which may be a 22 gauge electrical cable supplies power directly from power source 32 in central office 13 to optical network unit 15. From optical network unit 15 telephony services may be provided to subscriber premises 21 over a conventional twisted copper pair line 22 to a telephone 27. Typically an ONU serves up to eight subscriber locations. Video services from a number of video information providers 23, such as satellite systems or video storage/retrieval equipment, or other suppliers are provided to subscriber premises 21 through coaxial cable 24. A video set-top converter 25 may or may not be required to descramble these video signals to a television 26.

The network depicted in FIG. 3 avoids several problems associated with the delivery of telephony and video signals to the home. That is, since the signals are carried on separate transport systems, each of the signals may be treated separately. For example, telephone 27 in subscriber premises 21 may be powered from central office 13 as is done in conventional telephony. Powering of the set-top converter 25 and television 26 may be done from subscriber premises 21. In addition, privacy issues with respect to telephony services over copper wire 22 are maintained as in a conventional telephony network. As is known in the art, more than one ONU could be connected to terminal 18. Similarly, more than one interdiction tap 16 could be connected to receiver 17. The drawbacks with the network shown in FIG. 3 include complexity and cost. That is, fiber optic cable 14, power cable 20, and coaxial cable 24 must be laid from each central office 13 to each optical network unit 15 or subscriber premises 21. In addition, additional equipment such as remote digital terminals 18 are required to efficiently transport the optical signals.

Figure 4:
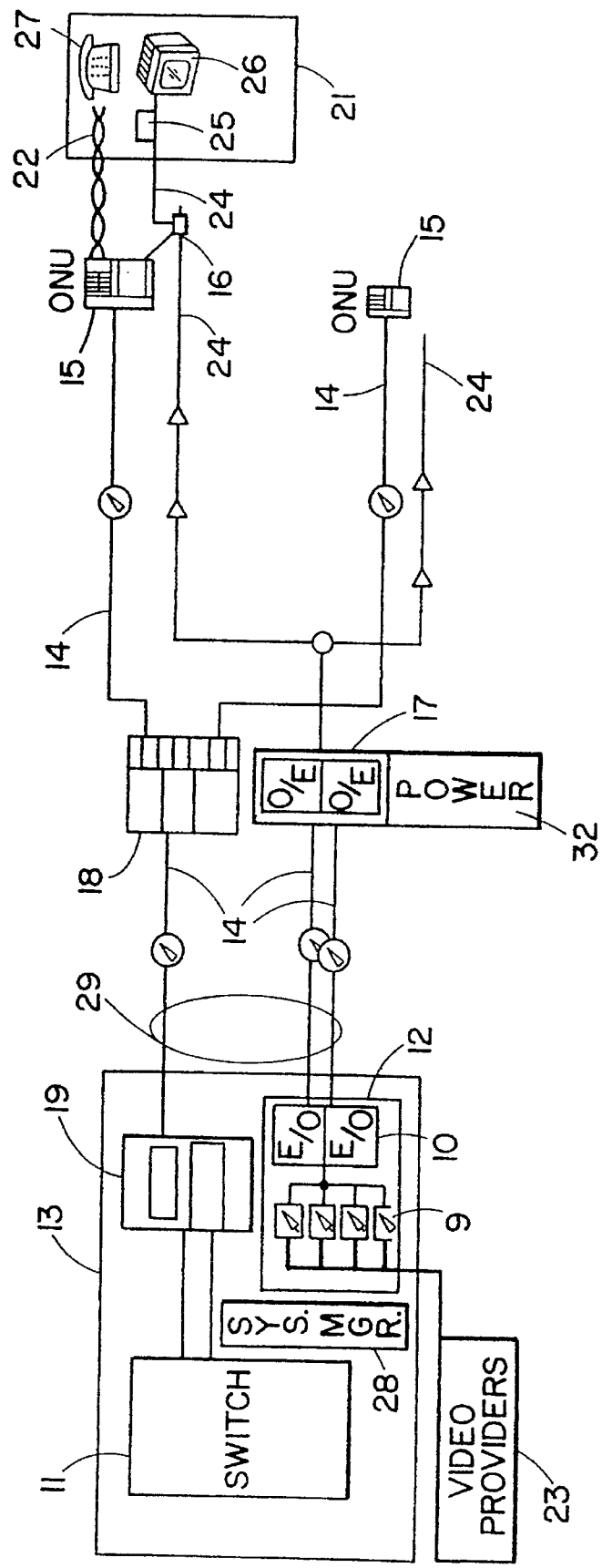
FIG. 4 illustrates an alternate hybrid fiber/coaxial cable network architecture.

Referring to FIG. 4, an alternate hybrid fiber coax network is illustrated. As with FIG. 3, central office 13 includes telephone switch 11 and video transmission equipment 12 from which a system manager 28 controls various ancillary functions of video services supplied from providers 23. As with the architecture in FIG. 3, telephony signals and video signals are carried from central office 13 on fiber optic cable 14 through the feeder portion of the outside plant 29. The telephony signals are passed through remote digital terminals 18 and supplied through fiber optic cable 14 to optical network unit 15. The video signals are transported to video receiver 17 where they are converted from optical to electrical signals on coaxial cable 24. The video signals are then supplied to interdiction device 16 at the location of the optical network unit 15. In this embodiment ONU 15 and interdiction device 16 are connected and preferably co-located. The major difference between FIG. 4 and FIG. 3 is that power may be supplied through coaxial cable 24 by a power supply 32 which may include an electrical connection to the electrical utility and backup batteries. Thus, power supply cable 20 in FIG. 3 is eliminated.

The elimination of power supply cable 20 represents a significant cost savings over the architecture of FIG. 3. As with FIG. 3, the video signals through coaxial cable 24 are supplied to customer premises 21 through interdiction unit 16 contained in optical network unit 15. Power is now supplied to telephone 27 from power supply 32 through coaxial cable 24 and ONU 15. Coaxial cable 24 from interdiction device 16 to customer premises 21 supplies only video signals to television 26 and does not supply power. As with FIG. 3, a video set-top converter 25 may or may not be included in the system. FIG. 4 represents a substantial improvement over the network shown in FIG. 3 in that the elimination of power supply cable 20 results in significant cost savings and simplifies the architecture.

While the architecture of FIG. 4 is an improvement on that of FIG. 3, it would be even more significant if the telephony signals and the video signals could be carried on a common transport system, thus eliminating the duplication of fiber optic cables shown in both FIG. 3 and FIG. 4. By carrying the video and telephony signals over a common integral network transmission system, however, other issues are raised. Chief among these issues is a privacy issue. That is, if the telephony and video signals were both sent to the subscriber premises 21 over the same line, it may be possible for a subscriber to "tap" into the telephony signals of all neighbors connected to the coaxial cable bus. This would be done by tuning and demodulating from the myriad of carrier channels on the coaxial cable in the telephony signal range. It would be relatively easy for one minimally skilled in electronics to devise means which could "tune in" on these telephony channels carried in the spectrum. This is possible because the other telephony signals in the example would also emanate from the remote optical node 17. With one coaxial cable system carrying all of these signals a subscriber is able to access the signals of these other subscribers.

Figure 5:
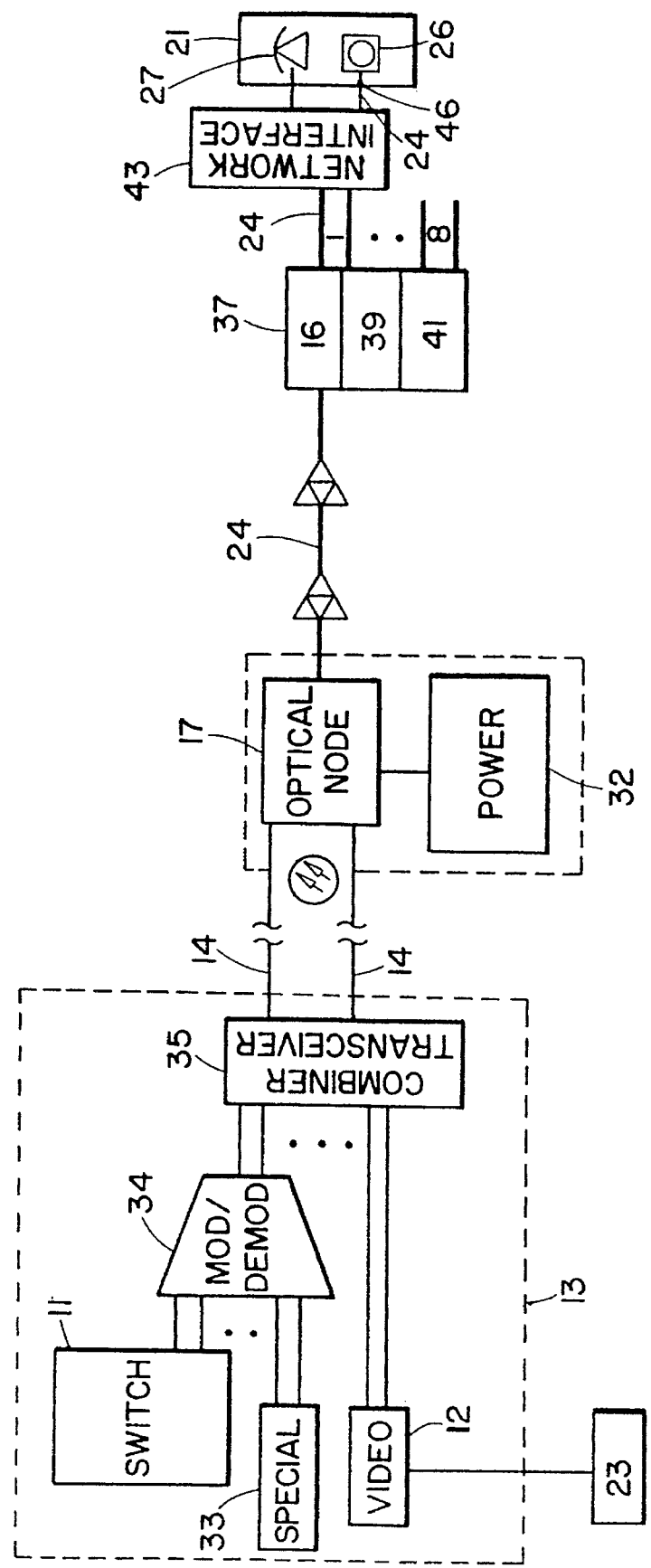
FIG. 5 illustrates a preferred embodiment of the invention for a hybrid fiber/coaxial cable network architecture.

Referring to FIG. 5, the preferred embodiment of a fiber/coax transport architecture is shown in which the telephony and video signals are transported through a common integral network. That is, central office 13 includes telephony switch 11 and video transmission equipment 12 as shown in FIGS. 3 and 4. Alternative video suppliers 23 could supply video signals to video transmission equipment 12. Telephony signals from switch 11 and from special services equipment 33 are supplied to a digital conversion RF modulator/demodulator unit 34. The telephony signals must be modulated to be transported on the analog passband fiber optic cable 14. The video signals from video transmission equipment 12 are combined with the telephony signals in a combiner transceiver unit 35. These optical signals are sent (and received) on fiber optic cable 14 to/from an optical node 17 which includes an optical/electrical conversion unit as shown in FIGS. 3 and 4. The remote digital terminal 18 as shown in FIG. 4 is eliminated because the distribution function it performs is no longer needed. Power plant 32 is co-located with optical node 17. By elimination of remote digital terminal 18 and the associated fibers in the main fiber optic cable, significant cost savings are achieved by this architecture over that shown in FIG. 4. It is the elimination of remote digital terminal 18 on the ONU 15 which raises the privacy issue. The combined telephony and video signals from optical node 17 along with the power supply from power plant 32 are carried on coaxial cable 24 to a selective delivery means which may include a Baseband Below Passband (BBP) device 37. Device 37 includes many of the functions performed by optical network unit 15 in FIGS. 3 and 4 with significant additions and modifications. Telephony and video signals are supplied to telephone 27 and television 26 on subscriber premises 21 through a network interface 43.

Figure 7:
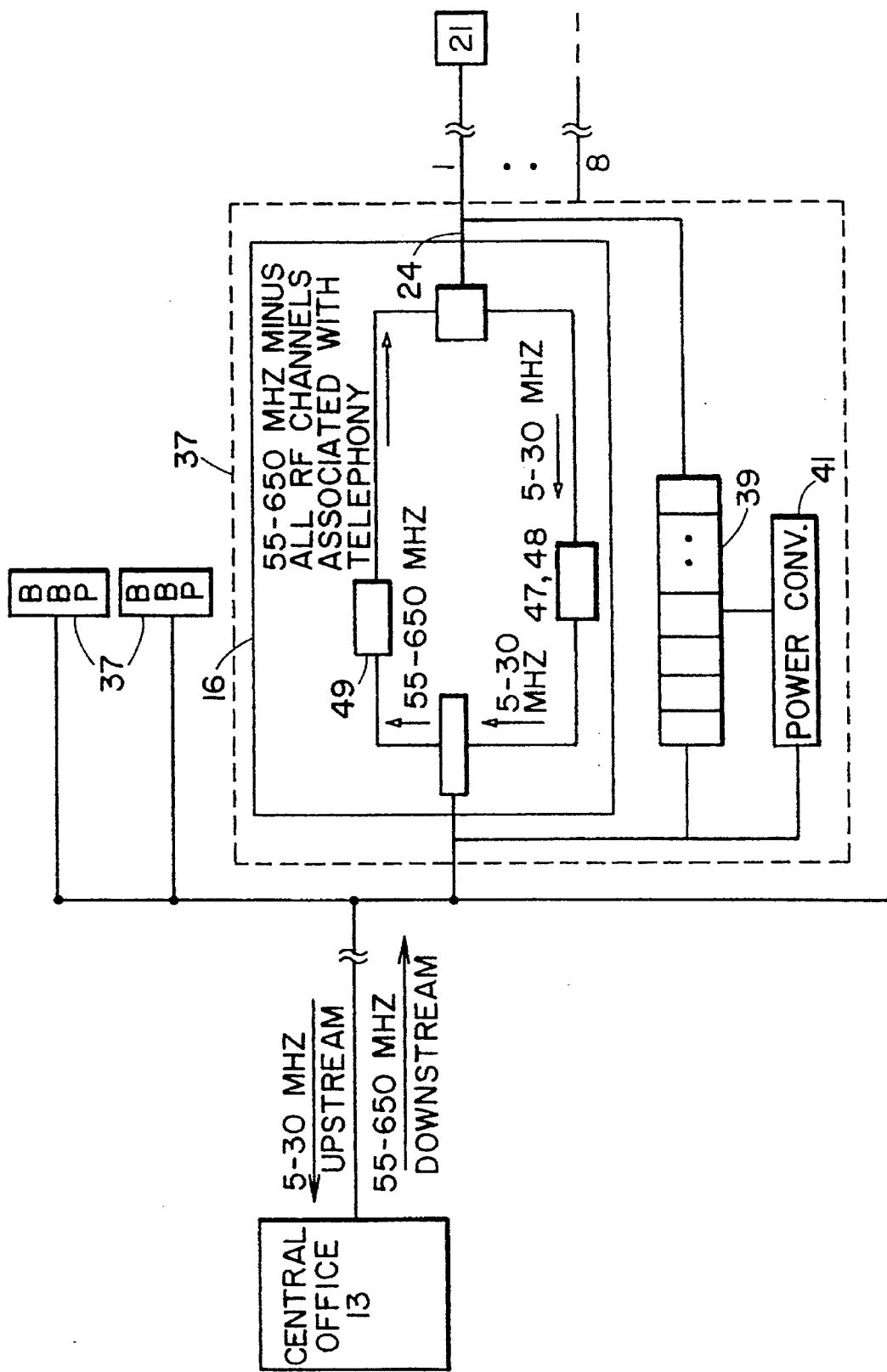
FIG. 7 is a schematic illustrating the interdiction device to ensure privacy protection for the preferred embodiment.

Referring to FIG. 7, BBP unit 37 is shown in greater detail. BBP device 37 includes an interdiction device 16 also used for telephony, a modulator/demodulator unit 39, and a power converter unit 41. Interdiction device 16 is a modification of the standard interdiction device known in the art and used in video networks. That is, a device such as an eight-port interdiction unit available from Scientific Atlanta Corporation (Model No. 9508-021) may be so modified. The standard interdiction device uses a jamming oscillator 49 to jam certain channels and transmit only those which are made available to the subscriber. Alternatively, a negative trap (consisting of band-stop filters) could be used in place of oscillator 49 as an interdiction device to attenuate the nondelivered channels below the noise floor. Interdiction device 16 is modified in the preferred embodiment by including isolation amplifiers 47 and forward coupler 48 in the upstream direction of transmission such that only the baseband telephony signal to and from the subscriber to be served is available at a given subscriber location. That is, the standard interdiction device is modified so that all of the downstream telephony channels are interdicted and each upstream 5–30 MHz port is isolated. Thus, a subscriber is prevented from tuning into telephone calls of other subscribers on the network.

Figure 1B:
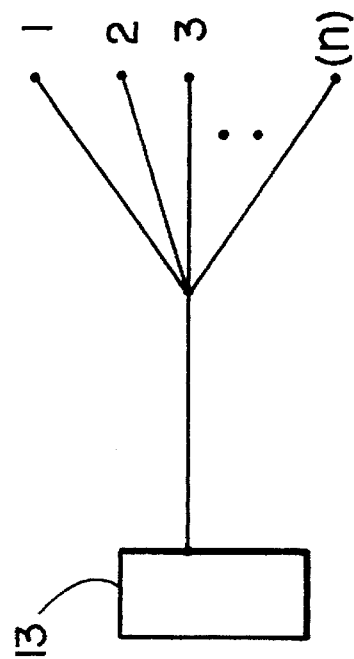
FIG. 1B illustrates a patty line "star" type network architecture.
Figure 1A:
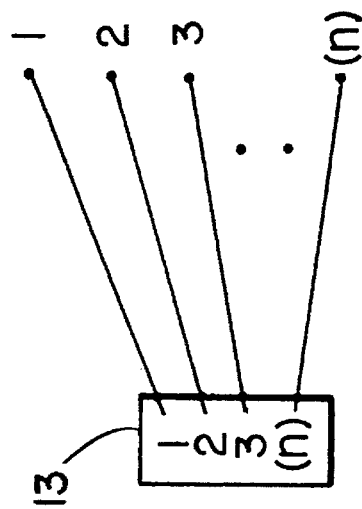
FIG. 1A illustrates a private line "star" type network architecture.
Figure 2B:
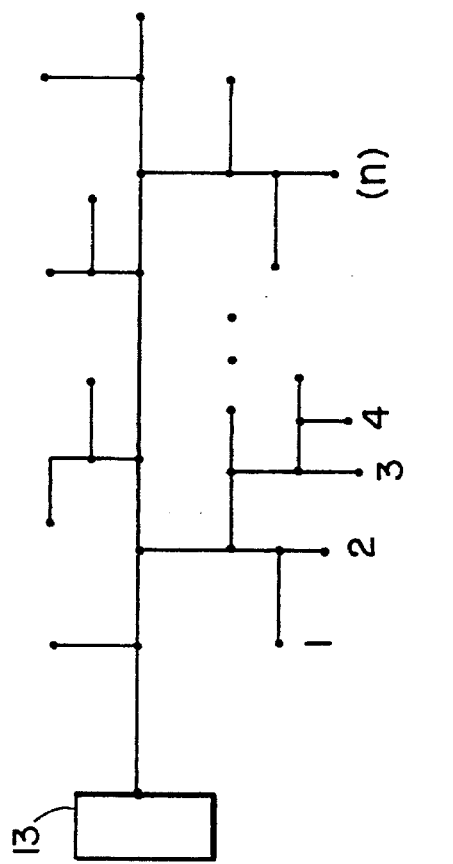
FIG. 2B illustrates a cable "bus" type architecture.
Figure 2A:
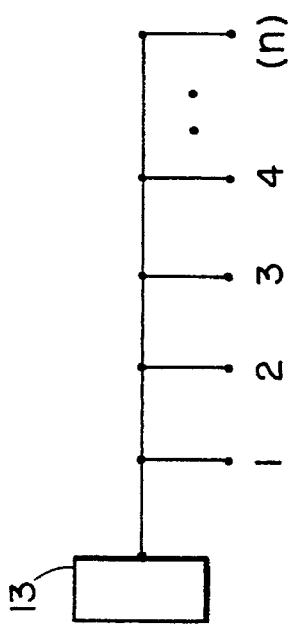
FIG. 2A illustrates a traditional "bus" type architecture.
Figure 6:
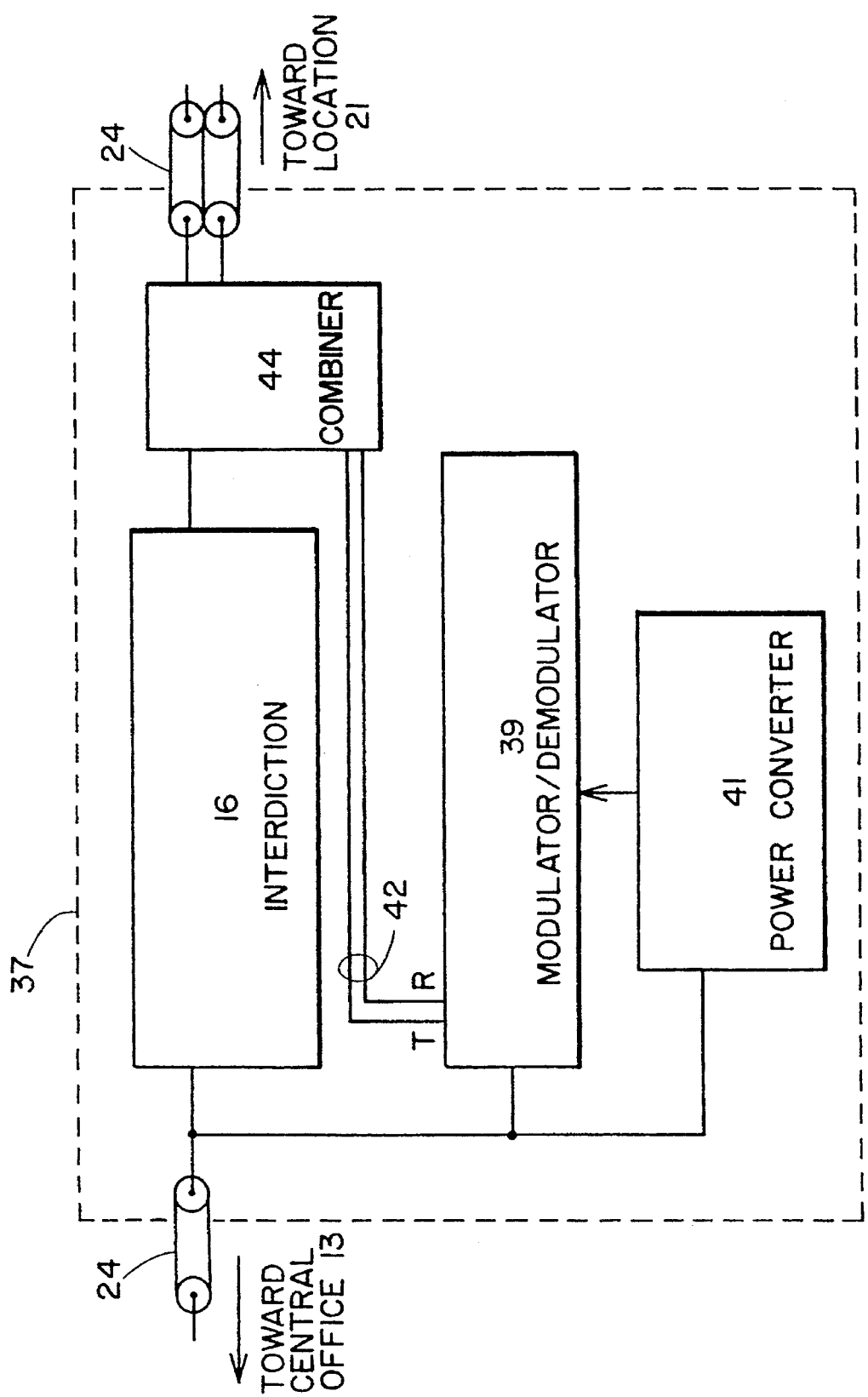
FIG. 6 is a schematic illustrating a baseband below passband curb unit.

Referring to FIGS. 5, 6, and 7, the privacy protection afforded by the present invention is illustrated. Central office 13 sends video and telephony signals "downstream" to subscriber's premises 21 and receives signals associated with video as well as telephony signals sent upstream from subscriber's premises 21. The architecture is essentially a "bus" type architecture (see FIG. 2). Thus, absent any precautions, each subscriber could monitor the video and/or telephony signals from other subscribers on the bus. For downstream video this is not a problem. The cable television company today uses this type of system and the only concern is to interdict (jam or trap) selected premium channels which the subscriber has not paid for. However, if interactive video and/or telephony are added, privacy becomes important.

In order to ensure privacy in this type of network, in addition to interdiction device 16 and modulator/demodulator device 39, additional protection is needed. Unless modified, interdiction device 16 ensures that only selected downstream video channels are delivered to subscriber premises 21. Modulator/demodulator device 39 ensures that only selected telephony channels are delivered to and from subscriber premises over the telephone line. However, for interactive video and to prevent the selective tuning to other subscribers telephone channels through the interactive video line 24 connected to F-fitting connector 46, additional interdiction is needed. In the preferred embodiment, isolation amplifier 47 and forward coupler 48 are added to a modified jamming oscillator 49 in interdiction device 16.

Amplifier 47 and coupler 48 may optionally be combined with bandpass filters (not shown) as is known in the art to selectively transmit a subset of upstream signals. As discussed above the 5–30 MHz bandwidth is used for telephone and interactive signals associated with video communications. There are three usable 6 MHz channels in this bandwidth from approximately 8–26 MHz. Since each 6 MHz channel can carry over 400 individual telephony channels, only two channels would generally be needed for telephony in the preferred embodiment. The other 6 MHz channel is available for interactive control/request signals associated with video services. Amp 47 and coupler 48 (optionally with selective filters) selectively transmit only the interactive signals associated with video channels in the upstream direction. All of the channels used for telephony are eliminated in the downstream direction by interdiction device 16. Thus, there is no way for any particular subscriber to listen to the telephony channels of another subscriber in either direction of transmission. Privacy is thus assured.

Referring to FIGS. 5 and 6, modulator/demodulator device 39, which may be a cable telephony device such as "CablePhone®" which is commercially available from Jerrold, Inc., demodulates the telephony signal from coaxial cable 24 and may send the demodulated telephony signal through standard copper tip and ring wires 42 directly to telephone 27. Modulator/demodulator unit 39 also receives the baseband telephony signals from telephone 27 in subscriber premises 21 and modulates that signal onto coaxial cable 24. Optionally, modulator/demodulator unit 39 could send the baseband telephony signal to combiner 44 to be combined with passband signals such as video onto coaxial cable 24. BBP device 37 also includes a power converter 41 which supplies −48 volt DC power, ±105 volt AC ringing power, and other converted power for the modulator/demodulator unit 39 to power the telephone 27 as in a standard telephony network.

Figure 8:
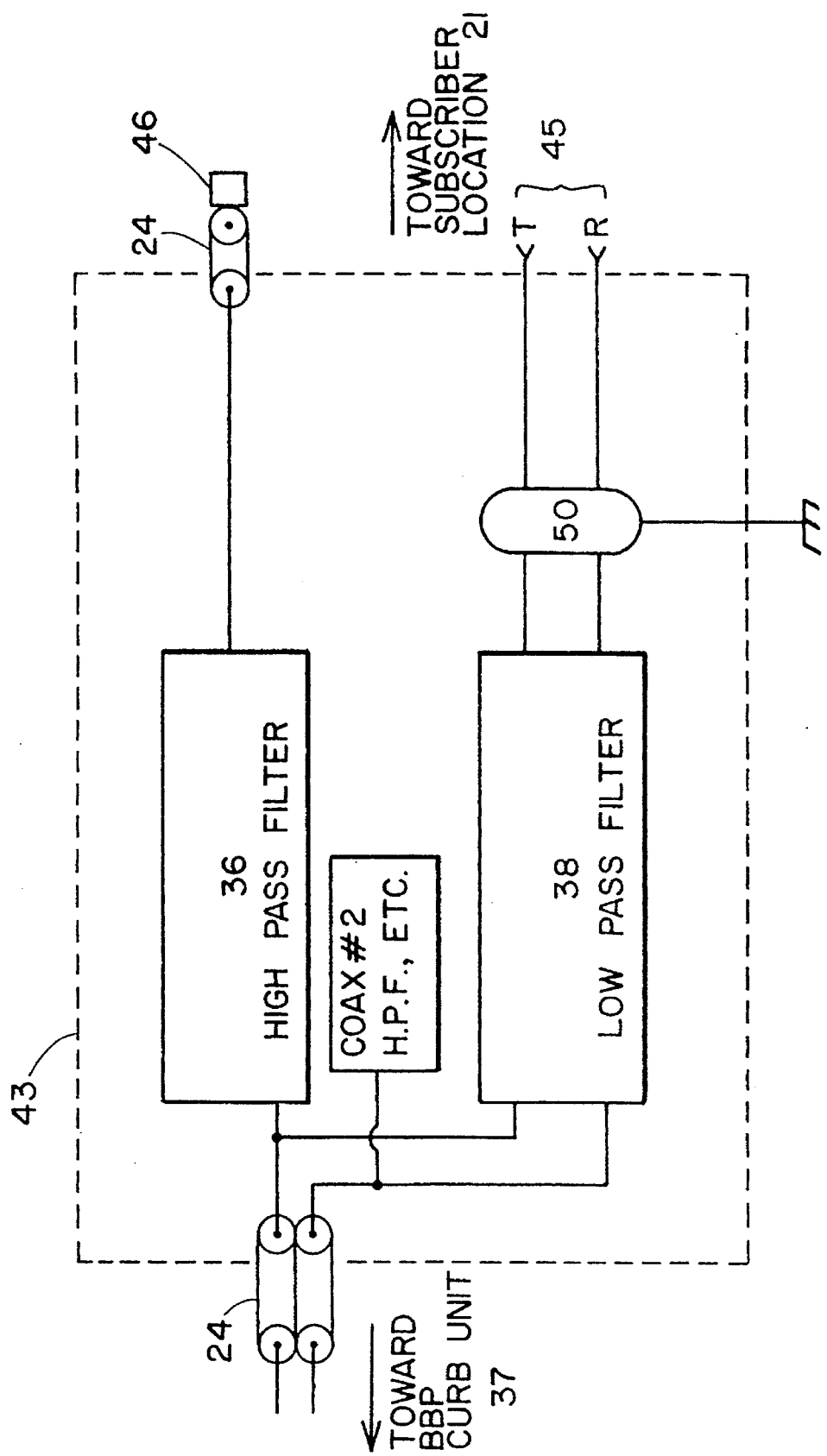
FIG. 8 is a schematic illustrating a network interface for the preferred embodiment.

Referring to FIGS. 5, 6 and 7, telephone 27 and television 26 on subscriber premises 21 receive the video and telephony signals through a network interface 43. In the embodiment shown in FIG. 5, the video signals from interdiction device 16 and the telephony signals from modulator/demodulator device 39 are combined in a combiner unit 44 (FIG. 6) and then sent over dual coaxial cable drops to a splitter. Referring to FIG. 8, splitter 36, 38 is contained in the network interface unit 43. That is, passive electronics are also included in network interface 43. The network interface unit 43 includes a high pass filter 36 with DC blocking to provide RF transparency for all passband frequencies and to block all telephony signals. A low pass filter 38 with DC transparency removes RF passband energy and passes all telephony signals. A twin carbon block protector unit 50 is also included as is known in the art. A standard RJ-11 telephony connector 45, and an F-fitting connector 46 which is standard in the video cable TV network are included. Because the connectors 45 and 46 are standard, the subscriber premises would not have to be rewired or locally powered to deliver services from this network. While the embodiment shown is the preferred embodiment, it is also possible to connect the coaxial cable from modified interdiction device 16 directly to the network interface F-fitting 46 and the copper wire 42 from modulator/demodulator device 39 directly to the RJ-11 connector on network interface 43. In either event, the modulated telephony signals which would otherwise be carried onto coaxial cable 24 along with the video signals are eliminated at interdiction device 16 such that only the demodulated telephony signal from demodulator device 39 is available to a particular subscriber. Thus, any possibility of a subscriber eavesdropping on telephone calls from other subscribers is eliminated. If more than one coaxial cable bearing video services is supplied to network interface 43, a P-Intrinsic-Negative (PIN) diode switch or other devices known in the art, for example, could be used to allow the subscriber to select which set of services he or she would prefer at any particular time.

The BBP unit 37 enables the network architecture shown in FIG. 5 to provide the best features of the two basic wire line approaches to residential access architecture (baseband FTTC and passband cable television) and solves for the respective problems of each approach at a cost significantly less than utilizing both types of network as shown in FIGS. 3 and 4. The network architecture disclosed in FIG. 5 provides a true broadband network that subsumes all existing services and all future services for telephony and video services at a cost substantially less than other types of hybrid networks.

Figure 9:
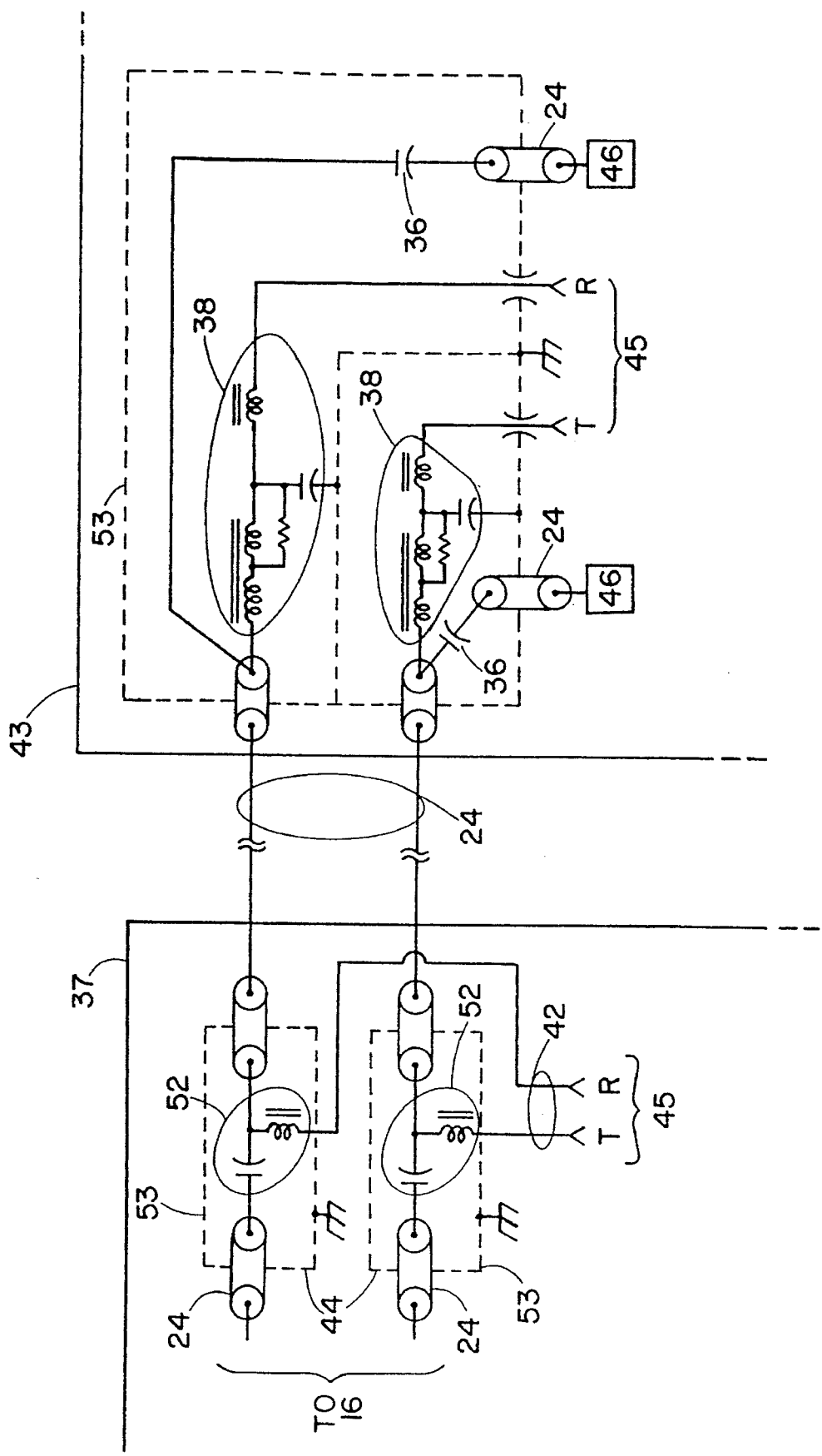
FIG. 9 is a more detailed drawing illustrating the combiner and splitter unit.

Referring to FIG. 9, a more detailed description of the combiner 44 and splitter 36, 38 is shown. As previously described, combiner 44 is contained in BBP unit 37. Combiner 44 preferably includes commercially available L-Section filters 52 shown schematically. These filters are contained in RF-shielded enclosures 53 providing greater than 65 dB of isolation between each of coaxial cables 24 over the passband. The splitter includes commercially available high pass filters 36 and low-pass filters 38 contained in network interface 43. As with the combiner, the filters are contained in RF-shielded enclosures 53 providing more than 65 dB of isolation between coax cables 24 which are connected to F-fitting 46.

The present invention uses frequency division rather than Time Slot Interchange (TSI) techniques to map the signals for transmission. By so doing, the cost associated with TSI equipment and the nonenablement of certain functions such as monitoring signal degradation (CRC6) is removed. Although TSI could be employed in the network of the present invention, frequency assignment techniques are preferred because the signals are already in the frequency domain for transmission. The present invention uses a linear channel which simultaneously transmits the signals parallel in time rather than in series in time. There is no mutual interference among the simultaneously transmitted signals in the linear channel because they are transmitted at different frequencies.

Figure 10:
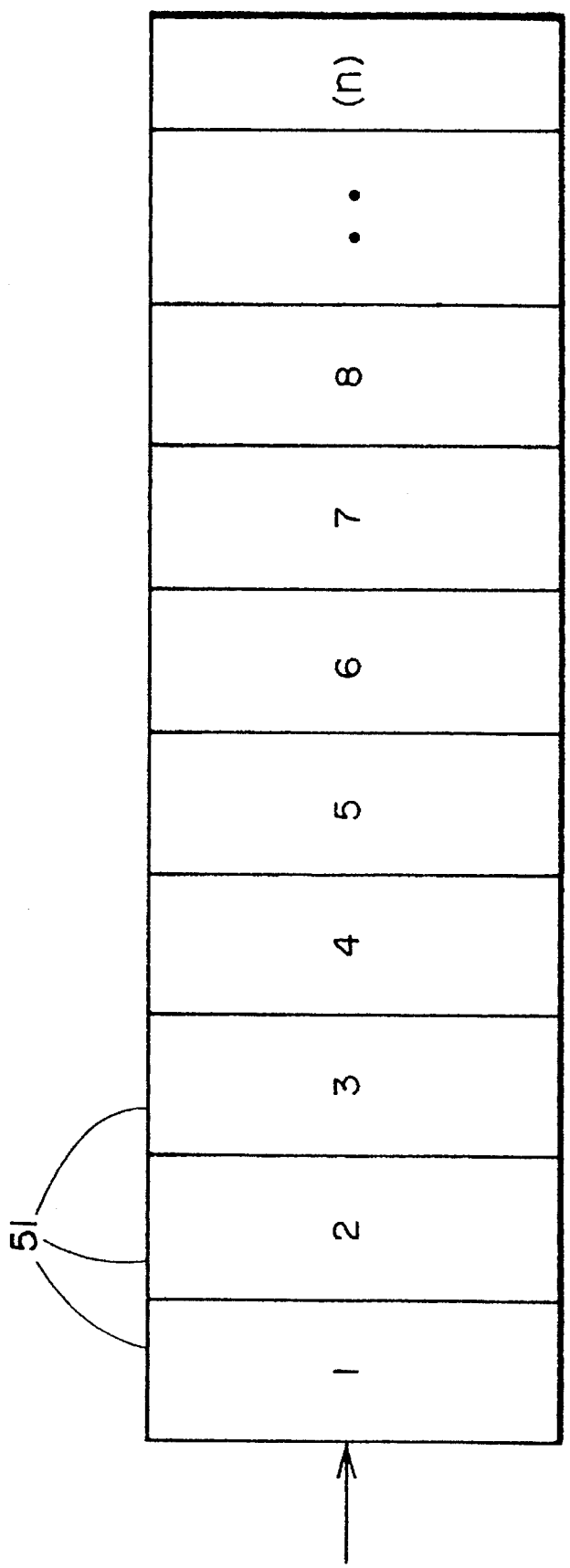
FIG. 10 illustrates network line cards.

Referring to FIG. 10, frequency division signal transmission is accomplished by remotely setting the specific transmit and receive frequency pairs for each channel card 51 in BBP device 37. Thus, segregation of switched services and special services into respective portions of contiguous spectrum is accomplished at the location nearest the user of the services. At central office 13 the RF modulated channels are converted to/from 64 kilobit per second (64 Kb/s) channels that are grouped together in blocks of 24, then formatted into a standard framed DS1 signal for termination on the digital switch 11. DS1 signals composed of only special services are routed to other terminal equipment, or transmission equipment for carriage to other locations. This approach allows the bulk conversion of groups of modulated carrier signals to/from DS1 digital signals, obviating the need for either Time Slot Interchange or individual carrier frequency translation ahead of bulk A/D conversion at central office 13. Another advantage of the approach is having "universal" channel cards 51 within a given type of service that can be installed in any slot in any BBP device 37. Thus, spare/replacement inventories of each are kept to a minimum. The frequency pairs associated with each card are set and controlled remotely, preferably in central office 13, such that the users may not alter the cards.

Each subscriber is assigned a unique transmit and receive frequency pair for telephony and special services. The assigned frequency pair is controlled from central office 13. Thus contiguous frequency assignment to card 51 in BBP device 37 is achieved. This permits grouping of nonswitched special services that will not terminate on the digital switch. Time slot interchange segregation of special and telephony services at central office 13 is eliminated. Since an optical node 19 could serve as many as 50 BBP curb devices 37, the frequency division technique allows for assignment of any available frequency pair to any service channel card 51 at the BBP device 37, regardless of physical location of the BBP device 37.

There are several significant benefits of the new BBP element. The first is the elimination of the baseband fiber-to-the-curb (FTTC) portion of previously known hybrid networks. This is made possible by the incorporation of the telephony services in the passband portion of the network, greatly simplifying the overall complexity of the outside plant portion of the architecture. The telephony services are provided by a cable telephony method which employs signal modulation with some important differences. Since talk battery and ringing voltage are powered from the network, local (inside home) powering problems are eliminated. Since the passband frequencies that carry telephony services are blocked beyond the selective delivery device, it is not possible to monitor other telephone subscribers' communications from a given residence. Thus, the privacy issues associated with telephony services previously provided through hybrid video-type networks are eliminated.

While the invention has been disclosed with respect to a preferred embodiment, changes and modifications may be made which are within the intended scope of the invention as defined by the appended claims.

What is claimed is:

1. A method for segregating telephony services and telephony special services in a logical bus network, operating in the frequency domain, said network including a central office and a transport system connected to said central office, said central office including a telephony switch and special service equipment, said transport system including a fiber optic system and a coaxial cable system connected to said fiber optic system, said method comprising the steps of:

dedicating at least one line card in said network to a subscriber;

assigning a frequency pair to said line card, said frequency pair corresponding to one of said services;

transmitting a signal including said frequency pair to and from said central office;

recognizing said frequency pair as indicative of a telephony service or a telephony special service; and routing a recognized telephony service to said switch and routing a recognized telephony special service to said special services equipment.

2. A method according to claim 1 wherein said step of assigning includes remotely assigning said frequency pair from said central office.

3. A logical bus network operating in frequency domain, comprising:

a central office including a digital switch and telephony special service equipment;

a transport system operatively connected to said switch, said transport system including a fiber optic system and a coaxial cable system connected to said fiber optic system;

a plurality of line cards operatively associated with said coaxial cable system;

each said line card including a preselected frequency pair assigned thereto, said preselected frequency pair corresponding exclusively to either a telephony service or a telephony special service;

means, associated with said digital transport system, for recognizing said assigned frequency pair; and whereby a signal from said line card is routed to said digital switch if said assigned frequency pair is recognized as a telephony service and a signal for said line card is routed to said special service equipment if said assigned frequency pair is recognized as a telephony special service.

4. A network according to claim 3 wherein said line card is included in network equipment remote from a subscriber location and said central office.

5. A network according to claim 3 further including means, associated with said transport system, for remotely assigning said frequency pair.

6. A method according to claim 1 wherein said line card is included in network equipment remote from a subscriber location and said central office.

* * * * *